July 23, 1968   G. G. BERNARD ET AL   3,393,738

METHOD FOR STORING GAS IN SUBTERRANEAN FORMATIONS

Filed Jan. 30, 1967

INVENTOR.
GEORGE G. BERNARD
LE ROY W. HOLM
BY Dean Sandford
ATTORNEY

| United States Patent Office | 3,393,738
Patented July 23, 1968 |

3,393,738
METHOD FOR STORING GAS IN SUBTERRANEAN FORMATIONS
George G. Bernard and Le Roy W. Holm, Fullerton, Calif., assignors to Union Oil Company of California, Los Angeles, Calif., a corporation of California
Continuation-in-part of application Ser. No. 294,497, July 12, 1963. This application Jan. 30, 1967, Ser. No. 612,639
22 Claims. (Cl. 166—29)

ABSTRACT OF THE DISCLOSURE

This invention comprises the use of foam to increase the gas storage capacity of a porous, water-bearing subterranean gas storage formation and to confine injected gas within a defined storage zone. An aqueous solution containing a foam-promoting agent is injected into the formation, either prior to or concomittantly with the gas injection. Foam formed within the formation by the passage of the injected gas through the foam-forming solution effects a substantial reduction in the permeability of the formation to gas.

---

Figure 1:
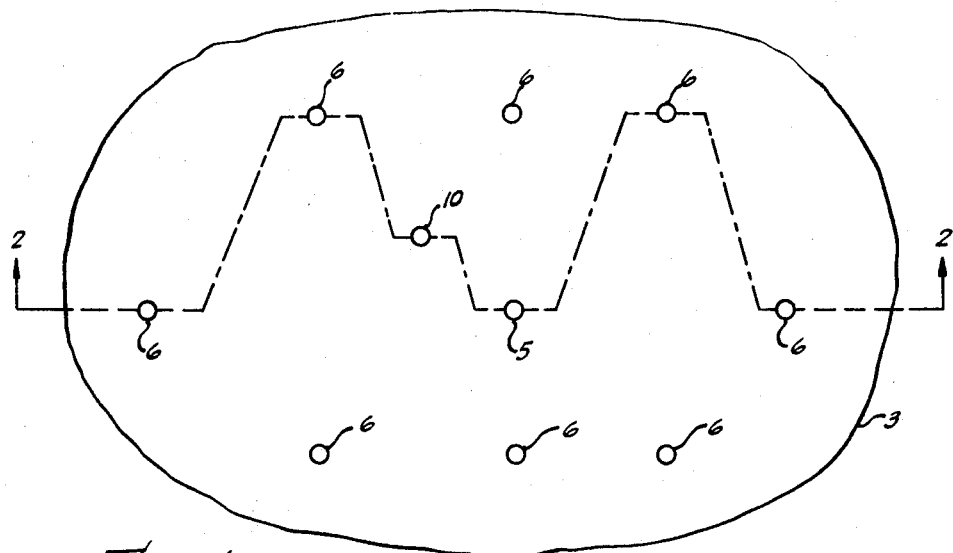

This application is a continuation-in-part of application Ser. No. 294,497 filed July 12, 1963, now abandoned.

This invention relates to a method for storing gas in natural porous subterranean formations and is more particularly concerned with a method for increasing the gas storage capacity of subterranean water-containing porous rock formations and for confining injected gas within a desired section of the formation.

It is well known to store natural and other gases in subterranean formations by injecting the gas under pressure into a well drilled into the formation. The amount of gas which can be stored will depend on a number of factors, such as the pressure under which it is injected, the permeability of the formation into which the gas is injected, and the amount of interstitial water and/or hydrocarbons retained in the formation. Suitable formations in which to store gas are mobile water-bearing, porous rock formations having a substantially impervious rock cap which seals the formation and prevents loss of the gas. Such formations are commonly referred to as aquifers. The term "aquifer" will hereafter be used to mean porous, mobile water-bearing subterranean rock formations overlain by a substantially impervious rock cap. Gas can also be stored in subterranean oil-bearing reservoirs or formations containing mobile water.

While the storage of gas in subterranean porous earth formations represents a relatively low cost method of accommodating fluctuations in the gas supply and demand, it is often difficult to locate suitable aquifers in a desired area. As is often the case, available formations are not sufficiently sealed to prevent the escape of gas from the storage area, or are of such extensive size as to render recovery of the injected gas difficult. A further difficulty encountered in the use of these naturally occurring aquifers is that only a portion of the mobile water is displaced from the interstices of the formation because of the poor mobility ratio involved in displacing the water with injected gas.

Acordingly, it is an object of this invention to provide an improved method for storing gas in natural reservoirs beneath the earth's surface.

It is another object of the invention to increase the storage capacity of water-containing subterranean, porous rock formations for storing gas.

It is another object of the invention to increase the amount of natural gas that can be stored in an aquifer.

It is another object of the invention to increase the amount of interstitial water displaced from a gas storage formation by an injected gas.

It is another object of this invention to confine an injected gas within a limited zone of a gas storage formation.

It is a further object of this invention to provide a method for minimizing gas leakage from a gas storage reservoir.

Other objects and advantages of the invention will be apparent to those skilled in the art from the following description.

Briefly the invention comprises a method of storing gas in a subterranean formation employing a foam-forming liquid to confine the injected gas within the formation and to improve the displacement of mobile water from the formation by the injected gas. The foam-forming liquid can be injected into the formation through gas injection wells in communication therewith or, alternatively, the liquid can be injected through a plurality of wells around the periphery of the gas storage zone. Also, the liquid can be injected at selected locations to control leakage of the injected gas through permeable strata. In one embodiment, an initial volume of an aqueous foam-forming liquid containing a relatively high concentration of an agent that causes the liquid to foam upon intimate contact with gas is injected into the formation, and subsequently a second volume of the aqueous liquid having a reduced quantity of foaming agent is injected.

Figure 2:
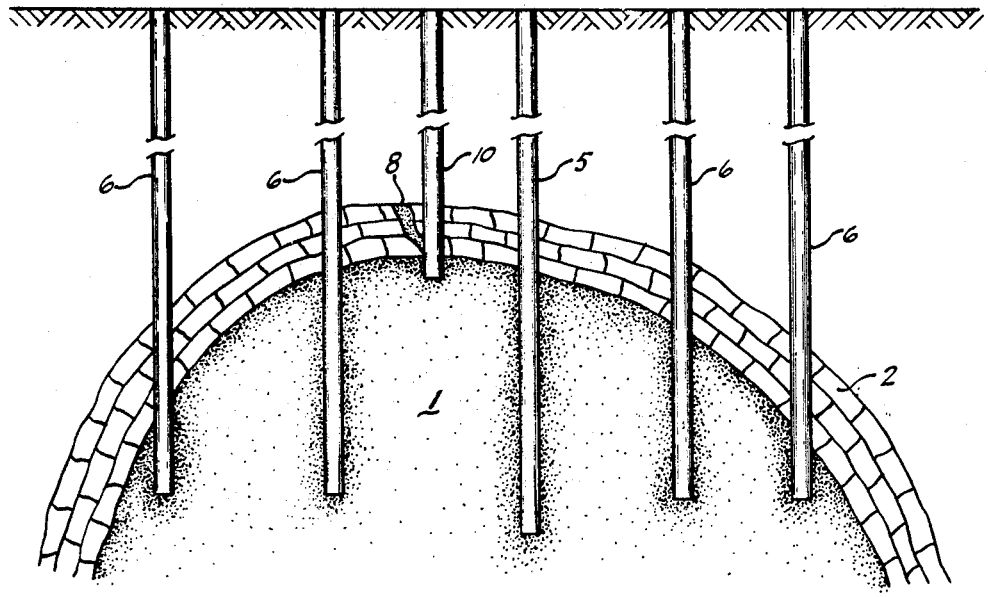

The invention will be more fully understood from the following detailed description and the accompanying drawings, in which:

FIGURE 1 is a plan view of the surface arrangement of a typical field showing the placement of wells to be used for the subterranean storage of gas; and FIGURE 2 is a vertical cross-section taken along an irregular plane determined by the line 2—2 of FIGURE 1.

We have discovered that the gas-storing capacity of aquifers and oil-bearing formations containing mobile water can be appreciably increased by initially injecting into the formation an aqueous slug containing an agent which causes the water to foam upon intimate contact with gas, and then immediately thereafter injecting the gas to be stored. Upon injection of the gas a foam bank is formed which creates sufficient resistance to the flow of gas to cause the gas to enter the small pores and passageways containing interstitial water, thereby forcing the water therefrom and providing additional space for storage of the gas. Furthermore, the foam forms a wall or envelope which contains the gas and prevents it from dissipating so far into the formation that it cannot be recovered through the withdrawal well. Alternatively, the foam-forming solution can be injected about the periphery of the storage zone so as to form a bank of gas-containing foam surrounding the storage zone. Also, in those cases in which a highly permeable streak, such as a fissure or fracture, exists in the cap rock which confines the formation, we have found that a foam can be formed to minimize the leakage of gas from the reservoir through the streak. It will be observed that, in some aspects, an advantage is to be gained by the utilization of a plurality of wells over a singular injection well inasmuch as the aqueous slug to which a foaming agent has been added is placed at the desired location much more rapidly than when only a single injection well is used.

In the FIGURES 1 and 2, a substantially gas impermeable cap rock 2 overlies a permeable mobile water-containing subterranean formation 1 so as to form a dome-shaped structure suitable for gas storage, the boundary 3 representing the outer limit of the gas storage zone. Formation 1 is penetrated by a well 5 suitable for the injection and withdrawal of the stored gas. Alternatively, a plurality of wells 5 can be used to obtain injection and withdrawal gas flow capacity. In one mode of practicing the invention, a plurality of peripheral liquid injection wells 6 are spaced about the periphery 3 of gas storage formation 1 in communication therewith. Often a formation suitable for the storage of gas will be found in a depleted gas or petroleum reservoir having existing wells drilled into the structure, more or less in accordance with the illustrated pattern. In some cases, some or all of these existing wells can be utilized, usually in conjunction with supplemental wells drilled specifically for the gas storage operation.

In accordance with one mode of practicing our invention, one or more wells 5 are drilled to the depth of formation 1 in which the gas is to be stored. An aqueous solution in the amount of approximately 0.001 to 0.2 pore volume of the aquifer or other mobile water-containing formation and containing approximately 0.001 to 10 weight percent of a foaming agent, and more particularly, 0.001 to 1 weight percent of the agent, is introduced through the well or wells under sufficient pressure to force the solution into the aquifer. The pressure under which the solution is introduced will depend on the formation pressure, and it is only necessary that the pressure be sufficiently greater than the formation pressure to force the aqueous solution from well 5 into the formation 1.

After injection of the aqueous solution containing the foam-producing agent is completed, injection of the gas to be stored is commenced and the gas is preferably injected through the same well or wells through which the aqueous solution is injected. Upon injection of the gas, foam is produced in the aquifer and because of the increased viscosity thereof, builds up resistance to passage of the gas into the formation. The injected gas thereupon flows through the smaller capillaries and into the small pores which the foam has not entered and which contain interstitial water, thereby driving the water therefrom and creating additional storage space for the gas. Pressure under which the gas is injected must be sufficient to force the gas into the small capillaries and pores from which water has not been dislodged by the foam, but should not be so great as to disrupt the foam before it has served its purpose. Ordinarily, injection pressure will be approximately 10 to 1000 lbs./sq. inch above formation pressure.

As the foam bank is driven further and further into the aquifer and spreads out and diffuses, its effectiveness may gradually decrease, making it advantageous to inject a second slug of aqueous solution similar to the first slug, and then resuming injection of gas. This procedure may be repeated as often as it is desirable, as indicated by a decrease in the pressure required to inject further quantities of gas into the formation.

When it is desired to recover gas from the formation in which it is stored, it can be withdrawn through the injection well or through other withdrawal wells which are drilled into the formation.

In another mode of practicing the invention, a bank of foam is formed at the periphery of the gas storage zone to confine injected gas within the gas storage zone. The peripheral gas confining foam bank is formed by injecting aqueous foam-forming solution into the formation through a plurality of wells spaced around the periphery of the gas storage zone such as the wells 6. The gas to be stored is injected into the formation through central well 5. Foam is formed as the injected gas passes outwardly from the storage zone through the foam-forming solution. Thus, in this mode of practicing the invention, foam-forming liquid is injected through the peripheral wells 6, commencing prior to initiation of gas injection through the well 5 and continuing through the gas injection step. Alternatively, the liquid injection can be delayed until after gas injection has been started and the gas has permeated a distance toward the boundary 3. Also, the foam-forming liquid can be injected intnermittently during the gas injection step, rather than continuously. This mode of practicing the invention has particular application where gas is to be stored in a flat structure not having the well-defined dome shape illustrated in FIGURE 2.

If the cap rock 2 over the formation contains a highly permeable streak, such as a fissure, fracture or other highly permeable area, through which gas leaks rapidly, it may be desirable to drill one or more wells into the formation adjacent to said area and to continuously or intermittently inject foam-forming solution therethrough in sufficient quantity to seal the area with foam and inhibit or prevent escape of gas therethrough. In general, such practice will minimize the amount of foam-forming solution which need be injected; amounts of solution as low as 0.001 pore volume will be effective in many applications of this aspect of the invention.

Accordingly, in another mode of practicing the invention, gas leakage from the storage formation through permeable zones of the cap rock can be reduced to tolerable levels by injecting foam-forming liquid into the permeable zone of the cap rock, or into the gas storage formation adjacent to the permeable zone. Referring again to the FIGURES 1 and 2, cap rock 2 has a permeable streak 8 through which stored gas can escape from storage formation 1. An existing well 10, or a well drilled specifically for this purpose, penetrates the cap rock and terminates either in the permeable zone 8 or, as in the illustrated example, in the formation 1 immediately below and adjacent to the permeable zone 8. The aqueous foam-forming liquid is injected through the well 10 and, upon being contacted by the stored gas, a bank of foam is formed in formation 1 adjacent to the permeable zone 8 and in the zone 8 which restricts the flow of gas therethrough.

As foam-forming agents, any one of a number of water-soluble surfactive agents which have foam-producing tendencies may be used. The surfactants are materials which tend to concentrate at the surface of a liquid in which they are dissolved, and which lower the interfacial or surface tension of the liquid appreciably. As examples of such foam-producing agents, there may be mentioned dimethyl didodecenyl ammonium chloride, methyl trioctenyl ammonium iodide, trimethyl decenyl ammonium chloride, dibutyl dihexadecenyl ammonium chloride; water-soluble salts of esters of $C_3$–$C_6$ sulfo dicarboxylic acids having the general formula

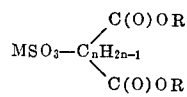

where M is a substituent forming a water-soluble salt, such as alkali metals, ammonium, and substituted ammonium, R is a $C_3$-$C_{16}$ alkyl substituent, and $n$ is an integer from 1–4, e.g., monosodium dioctyl sulfosuccinate, ammonium dilaurylsulfosuccinate, monosodium dibutyl sebacate, monosodium diamylsulfoadipate, and others; and water-soluble perfluoroalkanoic acids and salts having 3–24 carbon atoms per molecule, e.g., perfluorooctanoic acid, perfluoropropanoic acid and perfluorononanoic acid. Other surfactive agents which have the ability to produce foam under the conditions above set forth are:

| Trade Name | Chemical Name |
| --- | --- |
| Aerosol C-61 | Ethanolated alkyl guanidine-amine complex. |
| Aerosol OS | Isopropyl naphthalene sodium sulfonate. |
| Aerosol OT | Dioctyl sodium sulfosuccinate. |
| Arquad 2C | Dicoco dimethyl ammonium chloride. |
| Arquad T | Tallow trimethyl ammonium chloride. |
| Duponol EP | Fatty alcohol alkylolamine sulfate. |
| Duponol RA | Modified ether alcohol sulfate soium salt. |
| Duponol WAQ | Sodium lauryl alcohol sulfate. |
| Ethomid HT-60 | Condensation of hydrogenated tallow amide and ethylene oxide. |
| Hyonic FA-75 | Modified fatty alkylolamide. |
| Miranol HM Concentrate | Ethylene cyclomido 1-lauryl, 2-hydroxy ethylene Na alcouolate, methylene Na carboxylate. |
| Miranol MM Concentrate | Same as Miranol HM except myristyl group is substituted for lauryl group. |
| Nacconal NR | Alkyl aryl sulfonate. |
| Ninol AA62 | Lauric diethanolamide. |
| Ninol 1001 | Fatty acid alkanolamide. |
| Petrowet R | Sodium alkyl sulfonate. |
| Pluronic L44 | Condensation product of ethylene oxide with propylene glycol. |
| Product BCO | C-cetyl betaine. |
| Renex 650 | Polyoxyethylene alkyl aryl ether. |
| Sorbit AC | Sodium alkyl naphthalene sulfonate. |
| Sulfonole FAF | Sodium salt of fatty alcohols, sulfated. |
| Triton AS-30 | Sodium alauryl sulfate. |
| Triton X-100 | Alkyl aryl polyether alcohol. |

A particularly preferred class of surface active agent useful in the practice of this invention are the anionic surfactants which can be described as those materials which, upon ionization, form negatively charged surface active ions. Examples of commercially available anionic detergents found particularly useful are "OK Liquid," a proprietary ammonium alkylpolyoxyethylene sulfate marketed by the Procter and Gamble Company and described in U.S. Patent No. 2,941,950, and "CD-128," a proprietary alkylpolyethoxy ammonium sulfate marketed by the General Aniline and Film Company.

In injecting the aqueous foam-forming liquid according to the above-described modes of practicing the invention, it is often advantageous to inject an initial portion of the foam-forming liquid at a relatively high concentration of foaming agent, and to reduce the concentration in subsequently injected portions of the liquid. Accordingly, a first portion of the liquid can conveniently have a concentration of foamig agent of between about 1 and about 10 weight percent, and a subsequently injected portion of the fluid can have a concentration of between about 0.001 and about 1 weight percent of foaming agent. Where a lower concentration range of foaming agent is desired, such as a range of about 0.001 to 1 weight percent, the first portion of the liquid can contain a foaming agent concentration approaching the higher limit of about 1 weight percent, and the subsequently injected portion can contain a lower concentration of foaming agent down to the lower limit of about 0.001 weight percent.

The aqueous slug may also contain a viscosity increasing agent to render the liquid more viscous, thereby increasing the viscosity and hence the effectiveness of the subsequently formed foam bank.

Any one of a number of known water dispersable thickening agents may be used to increase the viscosity of the foam-forming liquid. Exemplary of such agents are molasses, polymerized ethylene oxide, sugar, glycerine, natural and synthetic rubbers, particularly the rubberized polymers of isobutylene, copolymers of butadiene and acrylonitrile, copolymers of butadiene and styrene (Buna-S), polychloroprene, polystyrene, polybutadiene, polymethacrylate, polyvinyl chloride, water soluble polymers such as polyvinyl polyallyl alcohols, polyacrylamide, hydroxyethyl cellulose, hydroxymethyl cellulose, aqueous solutions of certain synthetic polmers such as the copolymers of methyl vinyl ether and maleic anhydride, polyacrylic acid, sodium polymethacrylate, acrylamide-acylic acid copolymer, polyvinyl pyridine, nitrocellulose, cellulose nitrate and polvinyl pyrrolidone. Of the many thickening agents useful in the practice, a particularly preferred material is partially hydrolyzed polyacrylamide wherein at least a portion of the substituent amide groups are hydrolyzed to carboxylic acid groups. Sufficient amounts of the foregoing thickening agents should be employed to effect an increase in the viscosity of the aqueous liquid, and preferably, a sufficient amount of the thickening agent should be employed to increase the viscosity of the liquid to approximately 5 to 100 centipoises at formation conditions, and more particularly to about 10 centipoises.

Saturation of the aqueous foaming agent-containing slug with $CO_2$ at superatmospheric pressures of 100–1000 p.s.i. may also be desirable. If a carbonated, aqueous foaming agent-containing slug is utilized, the carbon dioxide will come out of solution wherever a leak is encountered, because of a continuously decreasing pressure gradient, thereby generating foam which will seal or plug the leak before any gas escapes. Some of the carbon dioxide will escape through the cap rock and appear at the earth's surface, thereby giving early warning that gas leaks are present. Another advantage in the use of a carbonated foam-containing solution is that the minimum water saturation necessary to form foam in available.

As an example of the invention, an aquifer having a permeability of 1000 millidarcies and a porosity of 18%, and having a thickness of 100 ft. and an area of $10^6$ sq. ft., has a well drilled from the surface to near the bottom of the aquifer and the well is equipped with casing and control valves at the surface. There is injected through the well 0.1 pore volume of a brine solution containing about 1% of sodium chloride obtained from the formation, in which is dissolved 0.1% by weight of Arquad 2C. The reservoir pressure is 200 lb./sq. in. and the brine solution is slugged in at a pressure of 800 lb./sq. in. A total of 480,000 barrels of brine solution is slugged into the formation. Upon completion of the injection of the brine solution the natural gas is injected through the same well under a pressure of 800 lb./sq. in.

As previously pointed out, the foam performs a dual function, namely to increase the gas storage space within the aquifer or other water-bearing formation and to seal off the storage space by forming an envelope or wall around the storage area to confine the gas within a limited space and prevent loss of gas due to leakage through fissures and other flow paths. The more stable the foam, the more efficiently it will act as an envelope to contain the gas. The quantity of foaming agent used will depend on the size of the reservoir desired in which to store the gas. Sufficient foaming agent should be used to maintain a foam wall suffiicently thick to prevent rupture at gas injection pressure. This may be accomplished by periodically injecting a new slug of foaming agent.

As a further specific example, the cap rock over an aquifer containing gas at 800 p.s.i., has a gas leak consisting of a highly permeable streak (1 darcy permeability) which extends for 100 feet. The streak has a cross-sectional area of 10 square feet and a pressure drop of 600 p.s.i. Under normal conditions gas flow through this streak is at the rate of $$q = \frac{111 K A \Delta(p^2)}{\mu L T} = \frac{111(1)(600,000)}{60}$$

$$q = \frac{111 \times 6 \times 10^5}{60} = 1.11 \times 10^6 \text{ s.c.f./day}$$

In the foregoing formula $q$=gas flow in standard cubic feet/day,
$K$=permeability in darcies,
$A$=cross-sectional area in square feet,
$p$=pressure drop in p.s.i.,
$\mu$=viscosity of the flowing fluid in centipoises,
$L$=length of the flow path in feet,
$T$=temperature in degrees Rankine.

By injecting ten barrels per day of a solution of a 1% solution of Arquad 2C in 1% brine through a well adjacent to the leak, gas permeability is reduced to about 5% of its initial value and gas flow through the streak is reduced to $5.5 \times 10^4$ s.c.f./day.

Either fresh water or natural brines obtained from the earth may be used to dissolve the foaming agent, but where the formation contains clay it is preferable to use brine solutions in order to prevent undue swelling of the clay and plugging of the formation.

The embodiments of the invention in which an exclusive property or privilege is claimed are defined as follows:

1. The method of storing gas in a permeable subterranean formation overlain by a substantially impervious rock cap, which comprises:
   injecting an aqueous liquid into said formation through a well in communication therewith, said liquid containing a major proportion of water and a small amount of an agent which causes foaming upon contact with said gas;
   injecting said gas under pressure into said formation through a gas injection well;
   maintaining said gas in said formation under pressure for a desired period of time; and
   recovering gas from said formation.

2. The method defined in claim 1 wherein said aqueous liquid is injected into said formation through said gas injection well subsequent to the injection of said gas.

3. The method defined in claim 1 wherein said aqueous liquid is injected through a plurality of wells situated about the periphery of said formation and wherein said gas is injected through one or more wells in communication with said formation within the area defined by said peripheral wells.

4. The method defined in claim 1 wherein said substantially impervious cap rock has a permeable zone through which gas can escape from the storage formation and wherein said aqueous liquid is injected through a well in communication with said formation adjacent to said permeable zone.

5. The method defined in claim 1 wherein said aqueous liquid contains approximately 0.001 to 10 percent by weight of said foaming agent.

6. The method defined in claim 1 wherein said gas is natural gas.

7. The method of storing gas in a permeable subterranean formation overlain by a substantially impervious rock cap, which comprises:
   injecting a slug of aqueous liquid into said formation through a well in communication therewith, said liquid containing an agent which causes foaming upon contact with said gas;
   injecting said gas under pressure through said well and into said formation;
   maintaining said gas in said formation under pressure for a desired period of time; and
   recovering said gas from said formation.

8. The method defined in claim 7 wherein said slug of aqueous liquid amounts to approximately 0.001 to 0.2 pore volume of the formation and wherein said aqueous liquid contains approximately 0.001 to 10 percent by weight of said foaming agent.

9. The method defined in claim 7 wherein a first portion of said aqueous liquid injected into said formation contains a relatively high concentration of said foaming agent and wherein a subsequently injected portion of said liquid contains a lower concentration of said foaming agent.

10. The method defined in claim 9 wherein said first portion of said liquid contains approximately 1 to 10 percent by weight of said foaming agent and wherein said second portion contains approximately 0.01 to 1 weight percent of said foaming agent.

11. The method defined in claim 7 wherein slugs of said aqueous liquid and said gas are alternately injected into said formation.

12. The method defined in claim 7 wherein said gas is injected under sufficient pressure to displace interstitial water from said formation.

13. The method of storing gas in a permeable subterranean formation overlain by a substantially impervious rock cap, which comprises:
   injecting aqueous liquid into the formation through a plurality of wells situated about the periphery of said formation, said liquid containing an agent which causes foaming upon contact with said gas;
   injecting said gas under pressure through at least one gas injection well in communication with said formation within the peripheral area defined by said liquid injection wells;
   maintaining said gas in said formation under pressure for a desired period of time; and
   recovering said gas from said formation.

14. The method defined in claim 13 wherein said aqueous liquid contains approximately 0.001 to 10 percent by weight of said foaming agent.

15. The method defined in claim 13 wherein said aqueous liquid is intermittently injected into said formation.

16. The method defined in claim 13 wherein said aqueous liquid is injected substantially continuously concomitantly with the injection of said gas.

17. The method defined in claim 13 wherein said aqueous liquid is injected into said formation in sufficient amount to establish a bank of foam at the periphery of said formation upon being contacted by said gas.

18. The method of controlling gas leakage through a permeable zone of an otherwise substantially impervious cap rock overlying a gas containing formation which comprises injecting an aqueous foam-forming solution containing a major proportion of water into said permeable zone of said cap rock in sufficient quantity to inhibit the escape of gas therethrough.

19. The method defined in claim 18 wherein said aqueous foam-forming solution is injected through a well communicating with said formation adjacent to said permeable zone of said cap rock.

20. The method defined in claim 18 wherein said aqueous liquid is intermittently injected into said permeable zone of said cap rock.

21. The method defined in claim 18 wherein said aqueous foam-forming solution contains between 0.001 and 10 weight percent of an agent which causes foaming on contact with said gas.

22. The method defined in claim 18 wherein a first portion of said aqueous foam-forming solution injected into said permeable zone contains a relatively high concentration of an agent which causes foaming on contact with said gas, and wherein subsequently injected portions of said solution contain lesser concentrations of said foaming agent.

References Cited

UNITED STATES PATENTS

| | | | |
|---|---|---|---|
| 2,127,662 | 8/1938 | Grebe | 166—42 X |
| 2,866,507 | 12/1958 | Bond et al. | 166—42 X |
| 3,175,614 | 3/1965 | Wyllie | 166—42 |
| 3,207,218 | 9/1965 | Holbrook et al. | 166—45 X |
| 3,306,354 | 2/1967 | O'Brien | 166—42 X |
| 3,330,352 | 7/1967 | Bernard | 166—42 X |

STEPHEN J. NOVOSAD, *Primary Examiner.*